Oct. 22, 1940.  T. K. GREENLEE  2,218,529
CONTROL FOR CONDITIONING SYSTEMS
Filed Aug. 15, 1938

INVENTOR
Theodore K. Greenlee
BY
Parker, Carlson, Pitzner & Hubbar
ATTORNEYS

Patented Oct. 22, 1940

2,218,529

UNITED STATES PATENT OFFICE 2,218,529

CONTROL FOR CONDITIONING SYSTEMS

Theodore K. Greenlee, Rockford, Ill., assignor to Barber-Colman Company, Rockford, Ill., a corporation of Illinois Application August 15, 1938, Serial No. 224,858

11 Claims. (Cl. 236—74)

This invention relates to the actuation of a plurality of correlated regulating devices in a conditioning system, and one object is to improve upon the control disclosed in Patent No. 2,004,940, whereby to provide for closer regulation of the condition being controlled.

A more detailed object is to avoid possible overtravel of the auxiliary regulating device in a system of the above general character through the provision of means for disabling such device against further movement when the controlling condition is satisfied.

A further object is to adapt a control of the above general character for operation with a modulating action.

Figure 1:
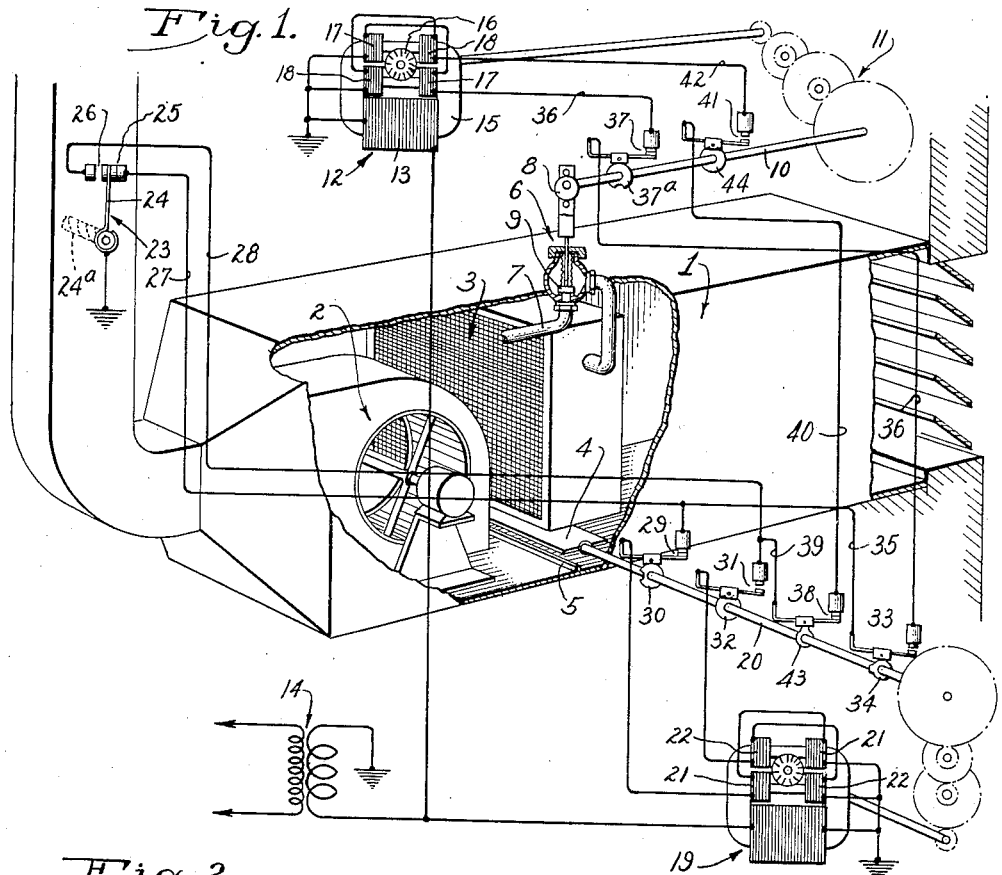

Other objects and advantages of the invention will become apparent from the following detailed description taken in connection with the accompanying drawing, in which Figure 1 is a schematic view and wiring diagram of a condition control system embodying the novel features of the present invention.

Figure 2:
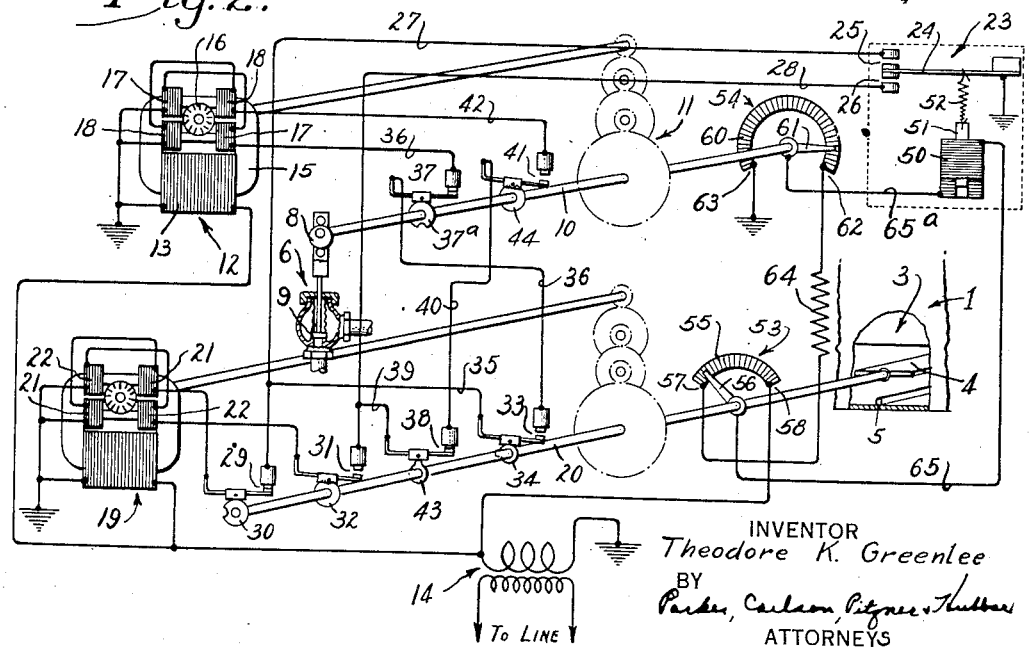

Fig. 2 is a wiring diagram of a modified control.

While the invention is shown and will, for convenience, be described as applied to the control of a system for changing the temperature of air within an enclosure, I do not intend by such disclosure to limit the invention but aim to cover all the modifications, alternative constructions, and uses falling within the spirit and scope of the invention as expressed in the appended claims.

In the exemplary system shown in Fig. 1, air to be conditioned is drawn through a duct 1 by a power blower 2, part or all of the air being subjected to a conditioner or temperature changer herein illustrated in the form of a coil or radiator 3. The effectiveness of the temperature changer is controllable independently of the amount of the conditioning medium supplied thereto at any time by the proportion of the circulating air current which is by-passed around the temperature changer through a passageway controlled by a damper 4 movable between the full open position shown in which a maximum amount of air is by-passed around the exchanger and a closed position against a stop 5 in which all of the air is forced through the coil 3.

The available capacity of the exchanger is determined in the present instance by the position of a valve 6 which controls the admission of conditioning fluid to the coil 3 from a feed pipe 7 supplied from a suitable source (not shown). The valve is arranged to be opened varying degrees to throttle the flow of fluid to the coil. This may be accomplished by any preferred form of power driven operator. The one shown herein is electrically driven comprising generally a cam 8 for moving the valve member 9 between open and closed positions in half revolution of a shaft 10 driven through speed reduction gearing 11 from a motor 12 preferably having two windings selectively energizable to determine the direction and extent of rotation. The motor shown is of the induction type having a main field winding 13 constantly energized during operation of the system from a source 14 of alternating current. The stator 15 of the motor provides two poles on opposite sides of a rotor 16 of the squirrel cage type preferably having its inductor bars exposed in the rotor surface.

The direction of operation of the motor is controlled by the reversing windings above referred to which are in the form of shading coils each enclosing one side portion of one motor pole and comprising a relatively large number of turns of wire. The coils are arranged in pairs 17 and 18 with the coils of each pair connected in series relation and disposed on diametrically opposite sides of the rotor. When the winding formed by the coils 17 is rendered effectual by short-circuiting the same, the magnetic field shifts around the rotor in a clockwise direction causing the rotor to turn in the same direction, and the valve member 9 to be moved away from its seat. In a similar way, counter-clockwise rotation and closing of the valve takes place when the coils 18 are short-circuited with the coils 17 remaining ineffectual. When the circuits for both pairs of shading coils are interrupted, the motor will remain idle and the position of the valve 6 will be maintained by the friction in the speed reduction gearing.

The damper 4 is arranged to be actuated at a comparatively slow rate by a reversible electric operator having a motor 19 and constructed similar to the valve operator above described so as to move from open to closed position in a quarter revolution of the shaft 20. Starting of the operator 19 to close the damper is initiated by short-circuiting of shading coils 21 and reverse movement occurs when shading coils 22 are effectual.

The damper operator is under the control of a sensitive condition-responsive device herein shown as a thermostat 23 responsive to the temperature of the air passing from the discharge end of the duct and having a thermal element 24ª arranged to move a tongue 24 and close a switch 25 when the temperature falls below the value for which the thermostat is set. A switch 26 is closed when the ambient temperature rises above this set value. The common or tongue contact of the thermostat switches is connected to the common terminal of the windings 21 and 22 as indicated by grounding on the drawing. The insulated contacts of the switches 25 and 26 are connected by conductors 27 and 28 to the insulated terminals of the windings 21 and 22 respectively.

Interposed in the conductor 27 is a switch 29 which is held closed by a cam 30 on the shaft 20 except when the damper 4 reaches fully closed position when the switch is opened. A similar limit switch 31 is interposed in the conductor 28 and arranged to be opened by a cam 32 when the damper reaches open position as shown in the drawing.

With the operator arranged to be controlled as above described, the thermostat acts to govern the extent as well as the direction of movement of the damper, any intermediate position of the latter being maintained while both of the thermostat switches remain open.

The movement of the damper 4 into closed position constitutes an indication that the amount of conditioning medium being supplied to the exchanger is insufficient to meet the existing demands on the system, and this movement is utilized to initiate opening or to cause further opening of the valve 6. To this end, a switch 33, which remains open at full open position or any intermediate position of the damper 4, is closed by a cam 34 on the shaft 20 when the damper reaches closed position. One terminal of this switch 33 is connected to a conductor 35 joined to the conductor 27 which extends through the thermostat switch 25 to ground. Thus, whenever the thermostat is calling for heat as evidenced by closure of its switch 25, the terminal of the switch 33 is grounded and thereby connected to the common or ground terminal of the shading coils 17 and 18 of the valve operator. The other terminal of the switch 33 is connected to the insulated end of the winding 17 through a conductor 36 having interposed therein a switch 37 which is held closed by a cam 37a on the shaft 10 except when the valve 6 is fully open.

With this arrangement, short-circuiting of the shading coil 17 which controls opening of the valve is conditioned not only upon the damper 4 being fully closed but also upon the thermostat switch 25 being closed. Therefore, if the valve 6 is partially open and the thermostat is calling for heat as evidenced by the closed condition of its switch 25, complete closure of the damper 4 will close the switch 33 and initiate operation of the motor 12 in a direction to open the valve. Such opening movement will continue until either the thermostat switch 25 opens or until the valve 6 reaches its limit open position.

Movement of the damper 4 into fully open position is an indication that conditioning fluid in excess of the amount required to satisfy existing demands is being delivered to the exchanger. Accordingly, the movement of the damper into and out of open position is utilized to close and open a switch 38 which is included in a circuit for the winding 18, the switch being actuated by a cam 43 on the shaft 20. This circuit extends from ground through the closed-when-hot thermostat switch 26, the conductor 28, a conductor 39, the switch 38, a conductor 40, limit switch 41, a conductor 42, the coils 18 to ground. The switch 41 is held closed by a cam 44 except in the limit closed position of the valve 6. When the circuit last mentioned is completed by the joint closure of the thermostat switch 26 and the damper responsive switch 38, the operator for the valve 6 is started in a direction to close the valve and continues to operate until the damper 4 moves away from open position, until the thermostat switch 26 opens or until the valve 6 becomes completely closed.

From the foregoing, it will be apparent that by modulating the position of the valve 6 in response to movement of the damper to opposite limit positions, the effective capacity of the conditioner 10 will be adjusted automatically to correspond approximately to the prevailing requirements on the system. Then, a more accurate regulation of the temperature of the discharged air is obtained by modulating the position of the damper 4 under the direct control of the thermostat.

By interposing the thermostat switches in the control circuits for the valve operator, movement of the valve to change the capacity of the exchanger is conditioned upon the thermostat being unsatisfied. That is to say, where the desired ambient temperature is attained while the valve 6 is being moved in either direction in response to movement of the damper into a limit position, the thermostat switch coacting with the damper actuated switch to control the valve motor will become open thereby interrupting movement of the valve even though the damper actuated switch continues to remain closed. In this way, the valve operator is disabled while the thermostat tongue is moving in either direction between its two contacts. Possible over-travel of the valve which might otherwise occur is thus avoided. Thus, the approximate adjustment of the conditioner capacity is made to correspond more accurately with the conditioning demands, this in turn contributing to greater accuracy in the regulation of the controlled condition.

Control of the valve movements in the manner described above is especially advantageous in so-called proportioning systems of the type in which the effective control point of the condition responsive instrument is shifted progressively with changes in the position of the regulating device being controlled. An adaptation of the present control to such a system is illustrated in the simplified wiring diagram in Fig. 2, the parts corresponding to those shown in Fig. 1 being indicated by the same reference numerals.

Shifting of the control point of the thermostat 23 is effected by varying the energization of a constantly energized solenoid 50 having a plunger armature 51 connected through the medium of a light contractile spring 52 to the tongue 24 which may comprise a bimetallic strip. The tension imposed on the tongue and therefore the thermostat control point, that is, the ambient temperature values at which the switches 25 and 26 will be closed, will be dependent on the degree of energization of the solenoid.

Energization of solenoid winding 50 is governed by two voltage regulators in the form of rheostats 53 and 54 respectively actuated in unison with the movements of the damper 4 and the valve 6. The rheostat 53 comprises a resistance element 55 engaged by a contact arm 56 fast on the damper operator shaft 20 and movable across the resistance 55 from a terminal 57 to a terminal 58 while the damper 4 moves from fully open to fully closed position. The rheostat 54 includes a resistance element 60 and a contact arm 61 which is fast on the valve operator shaft 10 and moves across the resistance from a terminal 62 to a terminal 63 in unison with the movement of the valve from closed to open positions. The terminals 57 and 62 of the rheostats are connected by a conductor having interposed therein a fixed resistance 64. The terminal 63 is grounded and the terminal 58 is connected to the ungrounded side of the power source 14 so that the voltage of the latter is impressed across the three resistances 55, 64, and 60 connected in series. Conductors 65 and 65a connect the rheostat arms 56 and 61 to the opposite terminals of the solenoid winding. Thus, the solenoid circuit extends from the winding 50 through the conductor 65a, contact arm 61, the part of the resistance 60 between the arm and the terminal 62, resistance 64, the part of the resistance 55 between the terminal 57 and the arm 56, and the conductor 65.

When the damper 4 is substantially open and the valve 6 is nearly closed as shown in Fig. 2, a low voltage will be impressed on the solenoid. If the system is assumed to be for heating and the thermostat now calls for heat, the switch 25 will become closed thereby initiating closing movement of the damper operator. This continues until voltage increase resulting from clockwise movement of the contact arm 56 causes the solenoid to draw the thermostat tongue downwardly and open the switch 25, it being assumed that the ambient temperature remains constant during this action. Reverse action occurs when the temperature rises to close the switch 26, the damper being moved toward open position and energization of the solenoid being decreased until the balanced or neutral position of the tongue 24 has been reestablished. As a result, the positions of the damper 4 and the contact arm 56 change progressively with and in proportion to changes in the temperature around the thermostat thereby producing a true proportioning action.

Opening of the valve 6 is initiated when the temperature decreases below the value at which the damper, for the prevailing setting of the rheostat 54, is moved to closed position. In this movement of the damper, the switch 33 becomes closed as the arm 56 reaches the terminal 58. Since the switch 25 is still closed, the windings 17 are short-circuited and the motor 12 is started in a direction to open the valve 6 and turn the contact arm 61 counter-clockwise as viewed in Fig. 2. The solenoid voltage is thus increased progressively until the control point of the thermostat has been reduced to the prevailing ambient temperature as evidenced by opening of the switch 25 whereupon the movements of the valve 6 and contact arm 61 are arrested. The available heating capacity of the conditioner is thus increased which normally will raise the thermostat temperature. When the switch 26 closes, the damper motor runs in the opening direction until the simultaneous counter-clockwise movement of the contact arm 56 results in raising of the thermostat control point to the prevailing ambient temperature.

Thereafter, while the position of the valve 6 and the rheostat 54 remain fixed, the damper will oscillate back and forth with changes in the thermostat temperature. The temperature range through which this proportioning action occurs will, however, be changed due to the new position of the valve 6 and the corresponding different setting of the valve actuated rheostat 54. Thus, for each different position of the rheostat arm 61, there will be a different range of ambient temperature through which the damper will be controlled, the damper assuming different positions corresponding to the different temperature values within the prevailing range.

When the damper, due to a sufficiently wide temperature variation, reaches fully open position, the switch 38 is closed and the valve operator is started closing the valve until a balanced condition of the solenoid and thermostat have been attained. Thus, the valve is closed with a proportioning action in the same manner as it is opened. As the setting of the valve is changed toward closed position and the rheostat 54 correspondingly changed, the temperature range through which the damper is oscillated will be raised. That is, as above described, this temperature range will be changed from time to time with changes in the valve position. It has been found that by proportioning the movements of both the damper and the valve in the manner described above, greater accuracy may be obtained in the maintenance of the condition being controlled under widely varying operating conditions. The arrangement is especially advantageous in avoiding wide variations in systems where the control instrument is located remotely from the conditioner as in the room being conditioned.

No claim is made herein to subject matter common to the disclosure of this application and that of a prior application, Serial No. 196,658, filed March 18, 1938, by Duncan J. Stewart and George Forrest Drake, to which application the present application is subordinate.

I claim as my invention:

1. A temperature control system having, in combination, a heat exchanger for tempering the medium to be controlled, a regulating member and a regulating element each movable back and forth to effect progressive variations in the effective capacity of said exchanger, a thermostat exposed to said medium and having a part movable between cold and hot positions through an intermediate position, mechanism controlled by said thermostat and operating to govern the direction and extent of said member while said element remains substantially idle, and mechanism controlled jointly by said thermostat and the movements of said member and operating to initiate movement of the element in one direction when said member is in one predetermined position and said part is in said cold position and to initiate movement of the element in the opposite direction when the member reaches a different predetermined position and said part is in said hot position, said element remaining idle when said part is in said intermediate position and said member is in either of said predetermined positions.

2. A condition control system having, in combination, a reversible regulating member movable varying distances back and forth between spaced positions, a regulating element, a control instrument having two switches respectively closed when the ambient condition is above and below the control point of the instrument, a reversible power operator operable to move said member in opposite directions in response to closure of the respective switches of said instrument, the position of said member remaining fixed when said switches are both open, and an independent reversible power operator for said element operable to cause movement of the element in one direction when said member reaches one of said positions and one of said switches is closed, and to cause movement of the element in the opposite direction when the member reaches said other position and said other switch is closed, said second operator being disabled against movement of said element when both of said switches are open.

3. A condition control system having, in combination, a reversible regulating member, a reversible power operator operable to move said member back and forth varying distances in opposite directions between two spaced positions, a regulating element, a control instrument having two switches respectively closed when the ambient condition is above and below the control point of the thermostat, two switches each actuated in response to movement of said member into and out of one of said spaced positions, an independent reversible power operator for said element including two windings selectively energizable to cause movement of the element in opposite directions, and circuits controlling said windings each including one of said first and second mentioned switches.

4. A condition control having, in combination, two independently operable regulating devices, a control instrument including a part movable between two spaced control positions through an intermediate neutral position, mechanism controlled by said instrument and operating to effect movement of one of said devices in opposite directions when said part is disposed in the respective controlling positions, the device being idle when the part is in said neutral position, and mechanism controlled jointly by the movements of said first device and said part and operable to effect movement of the other regulating device in one direction when said first device is disposed in one predetermined position and said part is in one of said controlling positions and to effect movement of said other device in the opposite direction when said part is in the other condition controlling position and said first device is in a predetermined position spaced from said first mentioned position.

5. A condition control having, in combination, a conditioner for varying the condition of a medium to be controlled, two regulating devices independently operable to modulate the effective capacity of said conditioner, a reversible power operator for moving one of said devices varying distances in opposite directions between two spaced positions, a control instrument responsive to condition changes of said medium, and a power operator controlled jointly by said instrument and the movements of said first device and operable to effect movement of the other regulating device in opposite directions when said first device is respectively disposed in said spaced positions and the conditioning requirements of said medium remain unsatisfied.

6. A condition control having, in combination, a conditioner for varying the condition of a medium to be controlled, two regulating devices independently operable to modulate the effective capacity of said conditioner, a reversible power operator for moving one of said devices varying distances in opposite directions between two spaced positions, a control instrument responsive to condition changes of said medium, and a power operator for modulating the position of said other device, switches respectively actuated as an incident to movements of said one device into the respective spaced positions, and means controlled jointly by said instrument and the respective switches to control the operation of said last mentioned operator in causing movements of said other device in opposite directions.

7. A condition control having two independently operable regulating members, a control instrument, mechanism controlled by said instrument to modulate the movements of one of said members between two spaced positions, a reversible power operator operating to effect movement of said other regulating member in one direction when said first member reaches one of said positions and in the opposite direction when the first member reaches the other predetermined position, an electrical device associated with said instrument and operable in accordance with its degree of energization to vary the control point of the instrument, and means for varying the energization of said device progressively with the movements of each of said members including independently operable voltage regulating mechanisms actuated in unison with the respective members.

8. A condition control having, in combination, a regulating member, a control instrument responsive to condition changes in a medium the condition of which is to be controlled, mechanism controlled by said instrument to change the position of said member in proportion to condition changes of said medium within a given range, a regulating element, a reversible power operator normally operable to effect movement of said element in one direction when said member reaches a predetermined position while moving in one direction and to effect movement of the element in the opposite direction when the member reaches another position while moving in the opposite direction, and mechanism operable automatically during movement of said element to shift said range of proportioning action in a direction and in an amount corresponding to the movement of the element.

9. A condition control having, in combination, a regulating member, a control instrument, mechanism controlled by said instrument to modulate the movements of said member between two spaced positions, a regulating element, a reversible power operator operating to effect movement of said element in one direction when said member reaches one of said positions and in the opposite direction when the member reaches the other position, the position of said element remaining fixed while said member is disposed between said positions, an electrical device associated with said instrument and operable in accordance with its degree of energization to vary the control point of the instrument, and an energizing circuit for said device including a voltage regulator for varying the energization of said device progressively with the movements of said member and a second voltage regulator actuated by said element and operable to vary the range of energization of said device effected by the first voltage regulator.

10. A condition control having a conditioner, first and second regulating devices operable independently to modulate the effective capacity of said conditioner, a reversible power operator for moving said first device varying distances in opposite directions between two spaced positions, a control instrument responsive to condition changes and continuously controlling first device to modulate the position thereof irrespective of the prevailing position of the second device, and a power operator controlled jointly by said instrument and said first device and operable to effect movement of said second regulating device in opposite directions when said first device is respectively disposed in said spaced positions and the existing conditioning requirements determined by said instrument remain unsatisfied.

11. A condition control having, in combination, first and second regulating devices independently operable to modulate the effective capacity of a conditioner, reversible electric motor driving means for moving said first device in opposite directions between two spaced positions, a control instrument having two switches respectively closed in response to opposite condition deviations from the control point of the instrument, circuits controlled by said switches and permanently controlling the operation of said driving means to modulate the position of said first device independently of the second device, third and fourth switches respectively operated as an incident to movement of said first device into and out of said spaced positions respectively, a second reversible electric motor driving means for actuating said second device, and circuits controlling said second driving means to operate said second device in opposite directions, one being controlled by said third switch and one of said instrument switches and the other being controlled by said fourth switch and the other instrument switch.

THEODORE K. GREENLEE.